Figure 1:
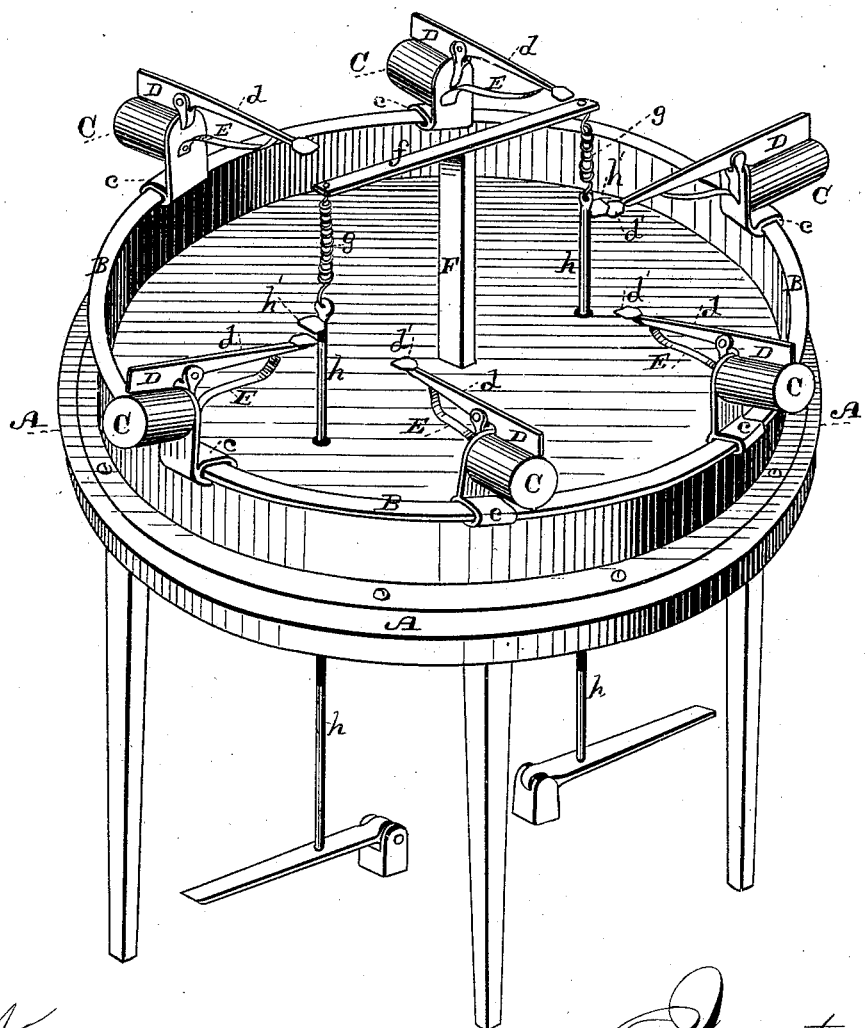

(No Model.)

J. P. HALLER.
ENDLESS TRACK FOR SEAMING CYLINDERS FOR CANS.

No. 257,219. Patented May 2, 1882.

Witnesses
Geo. H. Strong
Frank A. Brooks

Inventor
Joseph P. Haller
By Dewey & Co.
Attys

UNITED STATES PATENT OFFICE.

JOSEPH P. HALLER, OF SAN FRANCISCO, CALIFORNIA, ASSIGNOR OF ONE-HALF TO SOLOMON WANGENHEIM, OF SAME PLACE.

ENDLESS TRACK FOR SEAMING-CYLINDERS FOR CANS.

SPECIFICATION forming part of Letters Patent No. 257,219, dated May 2, 1882.

Application filed February 6, 1882. (No model.)

*To all whom it may concern:*

Be it known that I, JOSEPH P. HALLER, of the city and county of San Francisco, State of California, have invented an Endless Track for Seaming-Cylinders for Cans; and I hereby declare the following to be a full, clear, and exact description thereof.

My invention relates to an endless track for seaming-cylinders for cans, the object of which is to facilitate the work of soldering or seaming cans and to make it possible to separate skilled from unskilled labor, whereby more of the former may be utilized and a consequent saving in time and labor may be effected.

My invention consists in a circular guide or track bolted rigidly upon a table, upon which track the seaming-cylinders are adapted to slide. A mechanism in the center is employed, through treadle-power, to engage with and raise the securing or retaining knife, in order to allow the material to be fitted upon or taken from the cylinder, all of which will hereinafter more fully appear.

Referring to the accompanying drawing, the figure shows a perspective view of my device.

In making the body of a can there are usually three operations: First, the material is fitted around a forming or seaming cylinder, its meeting and overlapping edges being held in place by a knife attached to the cylinder; second, the seam is soldered; and, lastly, the knife is raised and the soldered can removed from the cylinder. This work is ordinarily performed by one man, and requires his attention to the three distinct operations, so that while using his hands to fit the material upon the cylinder or to remove it his soldering-tools must be laid aside. Therefore there is a loss of time. This method is open to the further objection that it does not distinguish between work requiring skill and work calling for no skill. The second operation—that of soldering the seams—requires skilled labor, while the simple fashioning upon or removing from the cylinder may be done by boys, and economy thus effected.

This brief statement of the method now employed will serve to show clearly the object and advantage of my invention.

Let A represent a table or stand. Upon it is rigidly bolted or otherwise firmly secured a raised flange guide or track, B, circular in shape, as shown.

C C are a number of forming or seaming cylinders. These are formed with guides $c$, fitting them upon the endless track and sustaining them horizontally and extending outwardly.

D D are the knives, having stems $d\ d$ pivoted upon top of the cylinders and extending inwardly and terminating in a flat end, $d'$, as shown. Springs E E hold the stems up, thus depressing the knives upon the cylinders.

In the center of the endless track B is a standard, F, having a top piece, $f$. Springs $g\ g$ hang from the ends of this piece, and are secured to rods $h\ h$, passing down and having suitable connections with treadle-levers. The tops of the rods $h\ h$ are provided with flat heads $h'$, which engage with the flat ends $d'$ of the knife-stems, and are thus adapted to press them down to elevate the knives. The springs $g\ g$ return the rods after being pressed down.

The operation of the device is as follows: A boy stands at one treadle and has a seaming-cylinder before him. He presses down upon the treadle, and through the mechanism described raises the knife D. He fits the material around the cylinder, and taking his foot from the treadle allows the retaining-knife to press down and hold the edges. He slides the cylinder along the track and directs his attention to another one. The first one is immediately soldered by the skilled workman, who stands beyond the boy. He slides the cylinder, with the soldered can, around to another boy opposite the first, who works the other lever to raise the knife and remove the can. The cylinder is then pushed around to the first boy. Thus all the cylinders are set in motion and passed from hand to hand, being held in right position for the work. The skilled laborer need not thus employ his time in fitting and removing the cans, and being engaged upon one single part need not lay down his iron, but can solder the cans as fast as pushed to him.

Having thus described my invention, what I claim as new, and desire to secure by Letters Patent, is—

1. The combination and arrangement of the endless track B and the seaming or forming cylinders C C, fitted upon the track and adapted to slide thereon, substantially as and for the purpose herein described.

2. The combination and arrangement of the endless track B, seaming or forming cylinders C C, having the pivoted retaining-knives D D and a spring, E, and a mechanism for raising said knives, substantially as and for the purpose herein described.

3. The combination and arrangement of an endless track, B, seaming or forming cylinders C C, having the pivoted retaining-knives D D, with stems $d\ d$, and held down by a spring, E, and the means for raising said knives, consisting of the rods $h\ h$, attached to a treadle, and having heads $h'$, adapted to engage with the ends of the stems $d\ d$, said rods being attached to springs $g\ g$, suspended from a standard, F, substantially as and for the purpose herein described.

In witness whereof I hereunto set my hand.

JOSEPH P. HALLER.

Witnesses:
WILLIAM HARNEY,
EMIL S. WANGENHEIM.